United States Patent
Farmer

(10) Patent No.: US 8,613,204 B2
(45) Date of Patent: Dec. 24, 2013

(54) SOLAR-POWERED COOLING SYSTEM

(75) Inventor: Joseph C. Farmer, Tracy, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 757 days.

(21) Appl. No.: 12/848,564

(22) Filed: Aug. 2, 2010

(65) Prior Publication Data

US 2011/0100036 A1 May 5, 2011

Related U.S. Application Data

(60) Provisional application No. 61/256,243, filed on Oct. 29, 2009.

(51) Int. Cl.
- F25B 15/00 (2006.01)
- F24J 2/48 (2006.01)
- F25B 27/00 (2006.01)
- F25B 15/02 (2006.01)
- F24J 2/46 (2006.01)

(52) U.S. Cl.
USPC ............................ 62/235.1; 62/101; 126/705

(58) Field of Classification Search
USPC .................................. 62/101, 235.1; 126/705
See application file for complete search history.

(56) References Cited

U.S. PATENT DOCUMENTS

| | | | | |
|---|---|---|---|---|
| 4,078,603 A | * | 3/1978 | Saunders | 165/48.2 |
| 4,232,820 A | * | 11/1980 | Ritter et al. | 237/2 B |
| 4,301,965 A | * | 11/1981 | Ritter et al. | 237/2 B |
| 4,509,337 A | | 4/1985 | Wiart et al. | |
| 4,531,384 A | | 7/1985 | Paeye | |
| 4,717,227 A | * | 1/1988 | Mori | 126/571 |
| 4,732,012 A | * | 3/1988 | Thorpe | 62/304 |
| 4,993,234 A | | 2/1991 | Korsgaard | |
| 5,339,645 A | | 8/1994 | Siegel | |
| 5,845,507 A | * | 12/1998 | Critoph et al. | 62/106 |
| 6,612,125 B1 | | 9/2003 | Gevargis | |
| 7,900,450 B2 | * | 3/2011 | Gurin | 60/641.2 |
| 8,580,438 | * | 11/2013 | Farmer et al. | 429/235 |
| 2002/0084188 A1 | * | 7/2002 | Tran et al. | 204/551 |
| 2013/0283845 | * | 10/2013 | Baumann et al. | 62/452 |
| 2013/0283846 | * | 10/2013 | Baumann et al. | 62/476 |
| 2013/0283847 | * | 10/2013 | Baumann et al. | 62/476 |
| 2013/0283849 | * | 10/2013 | Baumann et al. | 62/477 |

* cited by examiner

Primary Examiner — Ljiljana Ciric
Assistant Examiner — Alexis Cox
(74) Attorney, Agent, or Firm — Eddie E. Scott

(57) ABSTRACT

A solar-powered adsorption-desorption refrigeration and air conditioning system uses nanostructural materials made of high specific surface area adsorption aerogel as the adsorptive media. Refrigerant molecules are adsorbed on the high surface area of the nanostructural material. A circulation system circulates refrigerant from the nanostructural material to a cooling unit.

3 Claims, 9 Drawing Sheets

SOLAR-POWERED COOLING SYSTEM

CROSS-REFERENCE TO RELATED APPLICATIONS

The present application claims benefit under 35 U.S.C. §119(e) of U.S. Provisional Patent Application No. 61/256,243 filed Oct. 29, 2009 entitled "Solar-Powered Adsorptive Refrigeration Cycle with Nanostructural Foam & Aerogel Based Media," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to solar power and more particularly to a solar-powered cooling system.

2. State of Technology

U.S. Pat. No. 4,993,234 for a solar collector absorption cooling system provides the following state of technology information: "The exploitation of solar heat as an energy source has hitherto mainly been adopted for heating purposes, whereby different types of solar collector systems have gained interest on an equal footing with other kinds of alternative energy sources, as far as solar collector systems are concerned particularly for the heating of water with respect to tap water in buildings and for swimming pools and the like. In connection with solar powered air condition systems it is known, however, to incorporate an air cooling into a total solution in connection with water heating by combining the solar collector system with an absorption cooling system."

"Particularly in the hotter regions of the world and in places where the access to electric power and other conventional energy sources is difficult or expensive, there is a great and up till now badly fulfilled need for cold producing systems for various different purposes. Thus, such requirements exist with respect to the cooling of foodstuffs, pharmaceuticals and other products which do not stand storage at an elevated temperature, as well as air conditioning in living rooms for living beings, including particularly residential rooms."

U.S. Pat. No. 4,531,384 for a solar-powered refrigeration unit provides the following state of technology information: "Many types of refrigeration units where freezing takes place or is maintained at night by means of heat collected during the day by a solar energy collector have been developed heretofore. For example, U.S. Pat. No. 2,391,434 describes a unit of this type. The operating cycle for these units consists of two phases: a day phase during which fluid flows through a specific line, from the solar energy collector to the freezer; a night phase during which fluid flows through another line, from the freezer to the solar energy collector. When the two lines intersect at the outlet for the solar energy collector, a three-way valve which must be operated at the start of each phase is usually employed to change the direction in which the fluid travels. For this type of refrigeration unit, it is therefore necessary for procedures to be performed twice during each cycle."

U.S. Pat. No. 4,509,337 for a solar energy refrigeration device provides the following state of technology information: "We know several refrigeration devices which produce or keep ice during the night through the use of thermal energy collected by the solar collector during the day. Such a device is described in French Pat. No. 2,391,434. The operation of these devices consists of two phases: a diurnal phase during which a refrigeration fluid circulates from the solar collector toward the cold chamber through a first channel, and a night phase during which the refrigeration fluid circulates from the cold chamber towards the solar collector through a second channel. In order to link the interior of the collector with one or the other of the two channels, a three way valve is used, which valve permits the change in direction of fluid circulation and is set at the beginning of each phase."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a solar-powered adsorption-desorption refrigeration and air conditioning system that uses nanostructural materials such as aerogels, zeolites, and sol gels as the adsorptive media. Refrigerant molecules are adsorbed on the high surface area of the nanostructural material while the material is at a relatively low temperature, perhaps at night. During daylight hours, when the nanostructural materials is heated by the sun, the refrigerant are thermally desorbed from the surface of the aerogel, thereby creating a pressurized gas phase in the vessel that contains the aerogel. This solar-driven pressurization forces the heated gaseous refrigerant through a condenser, followed by an expansion valve. In the condenser, heat is removed from the refrigerant, first by circulating air or water. Eventually, the cooled gaseous refrigerant expands isenthalpically through a throttle valve into an evaporator, in a fashion similar to that in more conventional vapor recompression systems. However, in this case, the pressurization is due to thermal desorption, whereas in a conventional vapor compression cycle it is due to a reciprocating or centrifugal compressor.

In addition to direct solar heating of the adsorption bed, indirect heating with a flowing heat transfer medium can also be used. For example, solar energy can be stored in a suspended solid, liquid or gas that can be used to heat the adsorption bed via a flow loop and heat exchangers. For example, hot molten salts, molten metal, organic and inorganic liquids, gases and fluidized solids can be used to transfer heat to the adsorption bed, thereby causing thermal desorption of the refrigerant. In one embodiment of this invention, flowing nanofluids with exceptional heat transfer characteristics are utilized.

In one embodiment, the present invention provides a solar-powered adsorption-desorption refrigeration system. During Phase 1, incident solar radiation causes heating of the first bed of high specific surface area adsorption media (Bed A), which causes thermal desorption of the refrigerant. Refrigerant desorption increases the gas-phase pressure in the pores of the adsorption media, thereby forcing the gaseous refrigerant to flow out of the adsorption bed, through a two-stage condenser, while passing through the two-stage condenser, heat is first removed from the hot gaseous refrigerant by a stream of water that eventually flows into a hot water heater and storage system. Then, the refrigerant is further cooled by chilled refrigerant leaving the evaporator after vaporization. After passing through the two-stage condenser, the gaseous refrigerant undergoes isenthalpic expansion through an expansion valve. A portion of the refrigerant condenses in the evaporator, while some of the refrigerant is flashed (chilled refrigerant) and exits the evaporator. The evaporator absorbs heat from the room or area being cooled, which results in further vaporization of the refrigerant. The cool, vaporized refrigerant leaves the evaporator, passing through tubes in the shell-and-tube heat exchanger comprising the second stage of the two-stage condenser. Once leaving the tube-side of this heat exchanger, it flows to the second bed of adsorption media (Bed B), which is maintained by a lower temperature than the first bed. At night, the entire system is allowed to cool, and most of the refrigerant adsorbs on the second adsorption bed (Bed B). During the second phase, the refrigeration cycle is reversed, with thermal desorption from Bed B and adsorption on the cooler Bed A.

The present invention has use for various purposes, including but not limited to climate control. The present invention also has use for cooling homes and commercial buildings; cooling passenger compartments in various vehicles, including cars, trucks, commercial ships, and airplanes; cooling of high performance computing machines and electronics; cooling advanced energy conversion and storage devices, including batteries; cooling office buildings and laboratories; and cooling passenger compartments in military vehicles including trucks, tanks, armored personnel carriers, naval ships, submarines, airplanes, and spacecraft. The system can also be married to other appliances, including hot water heaters and space heaters.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1:
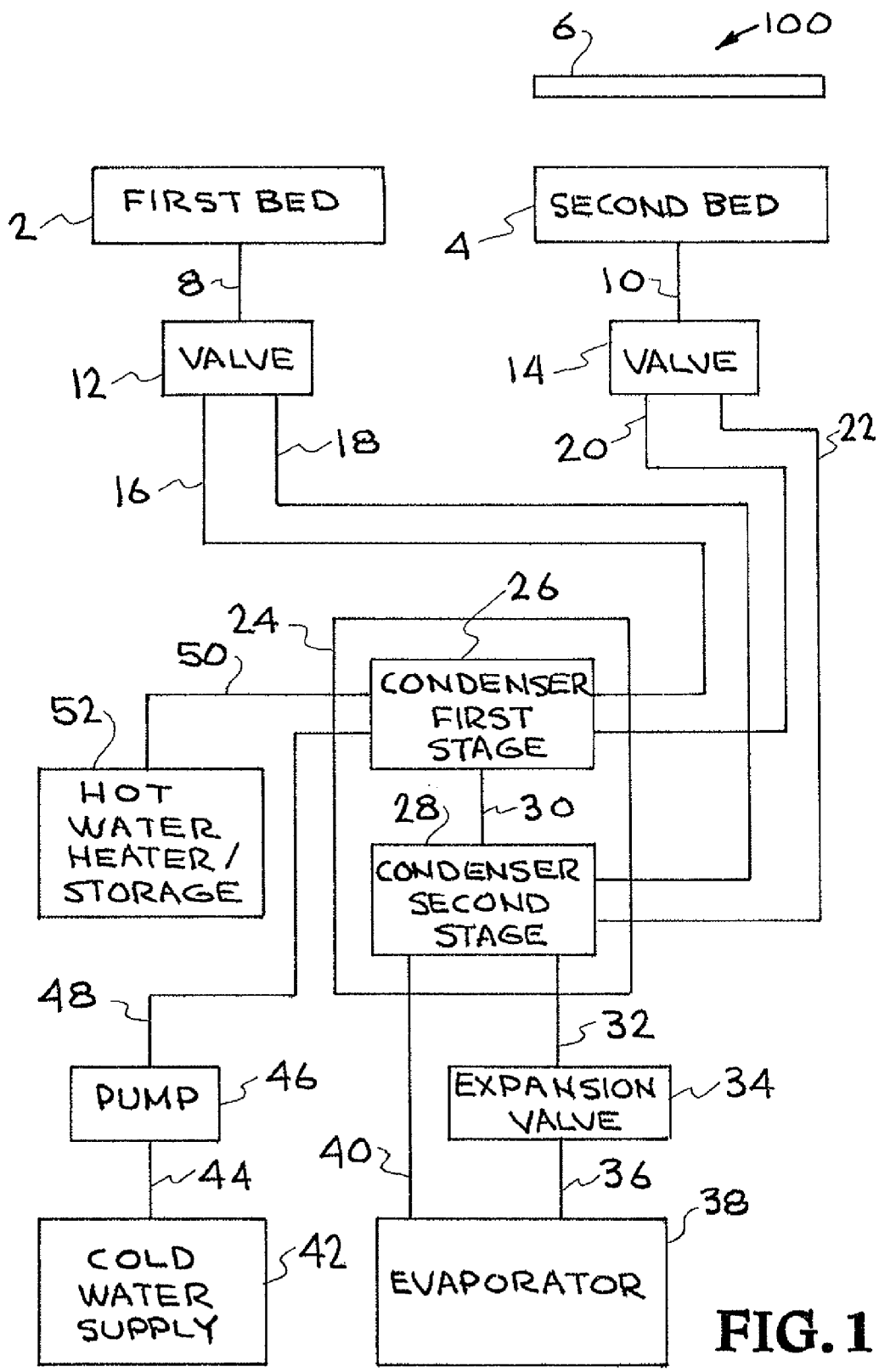
FIG. 1 illustrates one embodiment of a solar powered adsorption-desorption refrigeration system (ADRS) constructed in accordance with the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The present invention provides a solar-powered adsorption-desorption refrigeration and air conditioning system that uses nanostructural materials such as aerogels, zeolites, and sol gels as the adsorptive media. Refrigerant molecules are adsorbed on the high surface area of the nanostructural material while the material is at a relatively low temperature, perhaps at night. During daylight hours, when the nanostructural materials is heated by the sun, the refrigerant are thermally desorbed from the surface of the aerogel, thereby creating a pressurized gas phase in the vessel that contains the aerogel. This solar-driven pressurization forces the heated gaseous refrigerant through a condenser, followed by an expansion valve. In the condenser, heat is removed from the refrigerant, first by circulating air or water. Eventually, the cooled gaseous refrigerant expands isenthalpically through a throttle valve into an evaporator, in a fashion similar to that in more conventional vapor recompression systems.

A list of acronyms used in the description is provided below.
AC activated carbon
ADRS solar powered adsorption-desorption refrigeration system
BET Brunauer-Emmett-Teller [theory]
CA carbon aerogel
CFC chlorofluorocarbon
CMMD Condensed Matter and Materials Division (LLNL)
CRADA cooperative research and development agreement
DHS Department of Homeland Security
EDAX energy-dispersive analysis of x rays
EER energy efficiency ratio
ESEM emission scanning electron microscopy
HVAC heating, ventilation, and air conditioning
LLNL Lawrence Livermore National Laboratory
NREL National Renewable Energy Laboratory
SEER seasonal energy efficiency ratio
T&P temperature and pressure
TEM transmission electron microscopy
UHS ultrahigh surface (carbon aerogel)

As used in this application, the term "Retractable Shade" means any light blocking system adapted to selectively block energy from the sun. For example, the "retractable shade" can alternatively be a louvered shade, a shutter shade, an electronic light blocking system for blocking energy from the sun, or any other system for blocking energy from the sun.

In one embodiment, the present invention provides a solar-powered adsorption-desorption refrigeration system. During Phase 1, incident solar radiation causes heating of the first bed of high specific surface area adsorption media (Bed A), which causes thermal desorption of the refrigerant. Refrigerant desorption increases the gas-phase pressure in the pores of the adsorption media, thereby forcing the gaseous refrigerant to flow out of the adsorption bed, through a two-stage condenser. While passing through the two-stage condenser, heat is first removed from the hot gaseous refrigerant by a stream of water that eventually flows into a hot water heater and storage system. Then, the refrigerant is further cooled by chilled refrigerant leaving the evaporator after vaporization. After passing through the two-stage condenser, the gaseous refrigerant undergoes isenthalpic expansion through an expansion valve. A portion of the refrigerant condenses in the evaporator, while some of the refrigerant is flashed (chilled refrigerant) and exits the evaporator. The evaporator absorbs heat from the room or area being cooled, which results in further vaporization of the refrigerant. The cool, vaporized refrigerant leaves the evaporator, passing through tubes in the shell-and-tube heat exchanger comprising the second stage of the two-stage condenser. Once leaving the tube-side of this heat exchanger, it flows to the second bed of adsorption media (Bed B), which is maintained by a lower temperature than the first bed. At night, the entire system is allowed to cool, and most of the refrigerant adsorbs on the second adsorption bed (Bed B). During the second phase, the refrigeration cycle is reversed, with thermal desorption from Bed B and adsorption on the cooler Bed A.

The present invention has use for various purposes, including but not limited to climate control. The present invention also has use for cooling homes and commercial buildings; cooling passenger compartments in various vehicles, including cars, trucks, commercial ships, and airplanes; cooling of high performance computing machines and electronics; cooling advanced energy conversion and storage devices, including batteries; cooling office buildings and laboratories; and cooling passenger compartments in military vehicles including trucks, tanks, armored personnel carriers, naval ships, submarines, airplanes, and spacecraft. The system can also be married to other appliances, including hot water heaters and heaters.

Referring now to the drawings and in particular to FIG. 1, one embodiment of a solar powered adsorption-desorption refrigeration system (ADRS) constructed in accordance with the present invention is illustrated. FIG. 1 illustrates one embodiment of a solar powered adsorption-desorption refrigeration system of the present invention. The solar powered adsorption-desorption refrigeration system is designated generally by the reference numeral 100. Reference numerals are used to designate various components, systems, units, and devices which are generally identified as item(s).

Item 2 is a first bed of high specific surface area adsorption media, one example for this media is a nanostructural foam and/or aerogel based media. Item 4 is a second bed with the same properties of the first bed item 2. Item 6 is a retractable sun shade that can be moved to cover or uncover either beds 2 or 4 or can be positioned to uncover both beds 2 and 4 at the same time. The beds of high specific surface area adsorption media, item 2 and item 6, can be any nanostructural material. For example, the beds item 2 and item 6 can be an aerogel, a sol gel, a zeolite, or any other nanostructural material.

Item 2 can be any light blocking system adapted to selectively block energy from the sun. Item 2 can alternatively be a louvered shade, a shutter shade, an electronic light blocking system for blocking energy from the sun, or any other system for blocking energy from the sun.

Item 12 is a two-way valve that connects the first bed 2 to the two-stage condenser 24. Item 16 is a line that connects valve 12 to the condenser first stage 26 of the two-stage condenser. Item 18 is another line that connects valve 12 to the second stage 28 of the two-stage condenser. Line 30 connects the condenser first stage to the condenser second stage. Item 32 is line connecting the two-stage condenser to the expansion valve 34 and item 36 connects the expansion valve 34 to the evaporator 38. Item 40 is a line connecting the evaporator 38 to the condenser second stage. Item 10 is a line connecting the second bed 4 to a two-way valve 14. Item 20 is a line that connects valve 14 to the condenser first stage 26 and item 22 is a line connecting valve 14 to the condenser second stage 28. Item 42 is a cold water supply, this could be tap water entering a building. Item 44 is a line connecting the cold water supply 42 to a pump 46 that through line 48 connects to condenser first stage 26. Item 50 is a line that connects condenser first stage 26 to a hot water heater/storage module 52. This completes our description of the components of the (ADRS).

Figure 2:
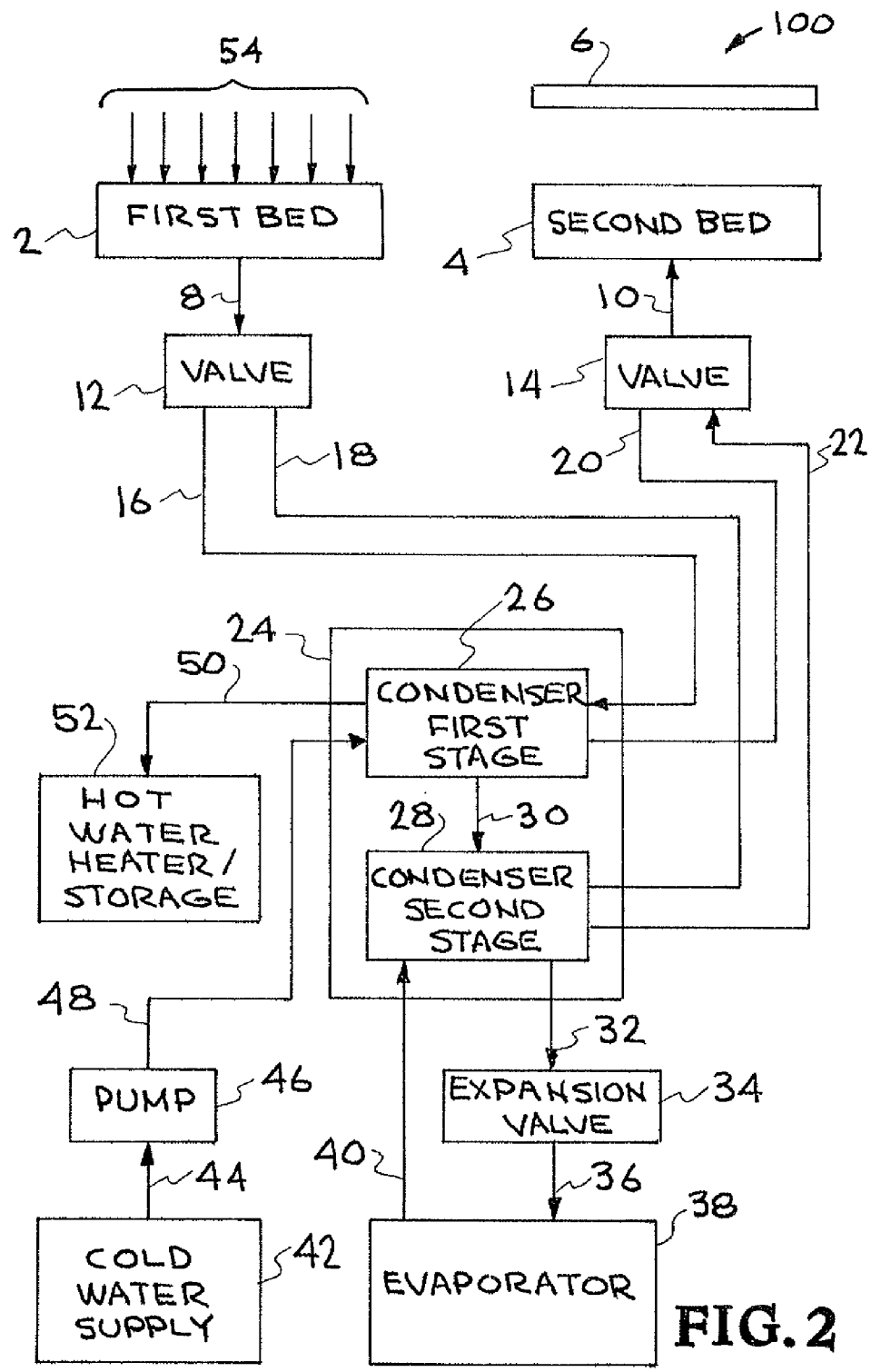
FIG. 2 illustrates phase 1 of the (ADRS).

Referring now to FIG. 2 phase 1 of the ADRS is illustrated. The solar powered adsorption-desorption refrigeration system (ADRS) is designated generally by the reference numeral 100. Incident solar radiation 54 causes heating of the first bed 2 which causes thermal desorption of the refrigerant stored in bed 2. Refrigerant desorption increases the gas phase pressure in the pores of the adsorption media, thereby forcing the gaseous refrigerant (GS) to flow-out of the first bed 2. The GS flows through line 8 to the two-way valve 12 and from there through line 16 to the condenser first stage 26 of two-stage condenser 24. In the condenser first stage 26 heat is removed from the GS by a stream of cold water supplied by cold water supply 42 and pump 46, after removing heat from the GS the warmed water exits the condenser first stage by line 50 and is stored in hot water storage module 52. This hot water can be used for other purposes in whatever structure the ADRS is used. The cooled GS through line 30 now enters the condenser second stage 28 where the GS is further cooled by the chilled refrigerant leaving the evaporator 38 after vaporization. After passing through the two-stage condenser 24, the GS undergoes isenthalpic expansion in the expansion valve 34. A portion of the GS condenses in the evaporator 38 while some of the GS is flashed (chilled refrigerant) and exits the evaporator 38. The evaporator 38 absorbs heat from the room or area being cooled, which results in further vaporization of the GS. The chilled vaporized GS exits the evaporator 38 and through line 40 enters the condenser second stage and proceeds through the tubes of a shell-and-tube heat exchanger which comprises the condenser second stage 28 of the two-stage condenser 24. The GS leaves the condenser by way of line 22 and passes through valve 14 and line 10 is deposited in the adsorption media of bed 4 which is at a lower temperature than the first bed 2.

Figure 3:
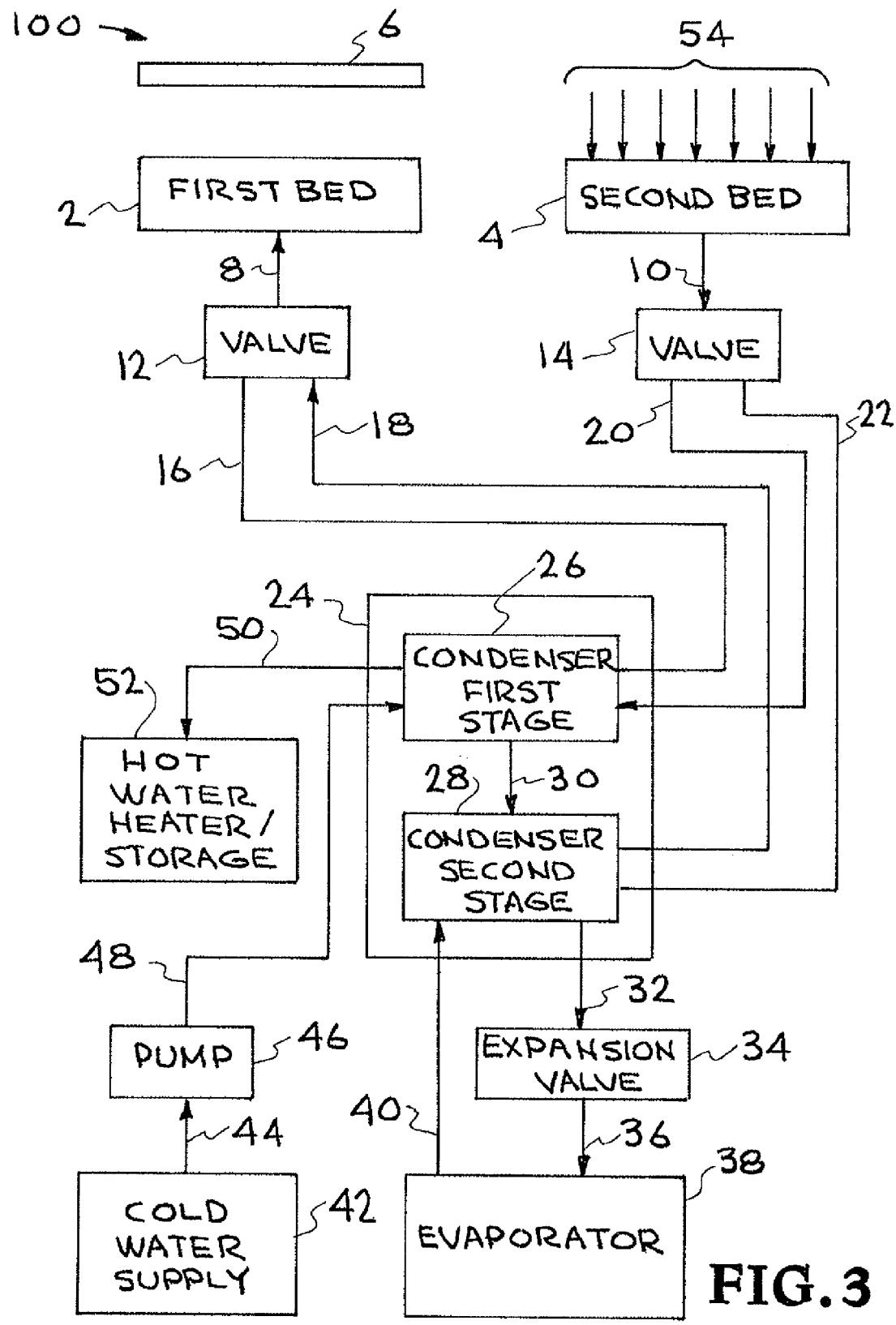
FIG. 3 illustrates phase 2 of the (ADRS).

Referring now to FIG. 3, the second phase of the refrigeration cycle is illustrated. During phase two the second bed 4 receives the solar radiation 54, heating the GS which flow through the ADRS in the reverse order, the GS ending up adsorbed in bed 2, which is at a cooler temperature. This cycling between bed 2 and 4 can take place several times during a day depending on the size of the ADRS. Non-Halogenated compounds with boiling points appropriate for use as refrigerants are tabulated in Table 1.

TABLE 1

| Name | Formula | FW | BP (° C.) | MP (° C.) | Density (g/cc) |
|---|---|---|---|---|---|
| carbon dioxide | CO2 | 44.0000 | −78.6000 | −56.6000 | 1.0310 |
| methyl silane | CH3SiH3 | 46.1200 | −57.0000 | −156.5000 | |
| propene or propylene | CH3CHCH2 | 42.0800 | −47.4000 | −185.2000 | 0.5193 |
| propane | CH3CH2CH3 | 44.1100 | −42.1000 | −189.7000 | 0.5831 |
| propadiene or allene | ClH2CCH2 | 40.0700 | −34.5000 | −136.0000 | 0.7870 |
| ammonia | NH3 | 17.0300 | −33.3500 | −77.7000 | 0.7710 |
| cyclopropane | C3H8 | 42.0800 | −32.7000 | −127.6000 | 0.7200 |
| dimethyl ether | CH3OCH3 | 46.0700 | −25.0000 | −138.5000 | |
| methyl acertylene or propyne | CH3CCH | 40.0700 | −23.2000 | −105.5000 | 0.7062 |
| methyl phospine | CH3PH3 | 48.0600 | −14.0000 | | |
| vinyl chloride or chloroethylene | CH2CHCl | 62.0500 | −13.4000 | −153.8000 | 0.9106 |
| bromo difluoro nitroso methane | BrF2CNO | 159.9200 | −12.0000 | | |
| methyl nitrate | CH3ONO | 61.0400 | −12.0000 | −16.0000 | 0.9910 |
| isobutane | (CH3)2CHCH2 | 58.1200 | −11.7000 | −159.4000 | 0.5490 |
| isobutylene | (CH3)2CCH2 | 56.1100 | −6.9000 | −140.3000 | 0.5942 |
| 1-butene | CH3CH2CHCH3 | 56.1200 | −6.3000 | −185.3000 | 0.5951 |
| amino methane | CH3NH2 | 31.0600 | −6.3000 | −93.5000 | 0.6628 |
| 1,3 butadiene or bivinyl | CH2C2H2CH2 | 54.0900 | −4.4000 | −108.9000 | 0.6211 |
| butane | C4H10 | 58.1200 | −0.5000 | −138.4000 | 0.6012 |
| trans 2-butene | CH3CHCHCH3 | 56.1200 | 0.9000 | −105.5000 | 0.6042 |
| trimethyl amine | (CH3)3N | 59.1100 | 2.9000 | −117.2000 | 0.6356 |
| cis 2-butene | CH3CHCHCH3 | 56.1200 | 3.7000 | −138.9000 | 0.6213 |
| 1-butene-3-one | CH2CHCCH | 52.0800 | 5.1000 | | 0.7095 |
| vinyl acetylene | CH2CHCCH | 52.0800 | 5.1000 | | 0.7095 |
| methane thiol | CH3SH | 48.1100 | 6.2000 | −123.0000 | 0.8665 |
| fulwene | C6H6 | 78.1100 | 7.0000 | | |
| 1-butyne | CH3CHCCH | 54.0900 | 8.1000 | −125.7000 | 0.6784 |
| neopentane | (CH3)4C | 72.1500 | 9.5000 | −16.5000 | 0.6135 |
| butadiyne | CHCCCH | 50.0600 | 10.3000 | −36.4000 | 0.7634 |
| 1,2 butadiene or methylallene | CH2CCHCH3 | 54.0900 | 10.8000 | −136.2000 | 0.6760 |
| cyclobutane | C4H8 | 56.1200 | 12.0000 | −50.0000 | 1.0457 |
| acetaaldehyde | CH3CHO | 44.0500 | 20.8000 | −121.0000 | 0.7834 |
| methanol | CH3OH | 32.0400 | 65.0000 | −93.9000 | 0.7914 |
| cycloneptane | C7H14 | 98.1900 | 118.5000 | −12.0000 | 0.8098 |

Similarly, halogenated compounds with boiling points appropriate for use as refrigerants are tabulated in Table 2.

TABLE 2

| Name | Formula | FW | BP (° C.) | MP (° C.) | Density (g/cc) |
|---|---|---|---|---|---|
| chloro trifluoro methane or Freon 13 | ClCF3 | 104.4600 | −81.1000 | −181.000 | |
| trifluoro acetonitrile | F3CCN | 95.0300 | −64.0000 | | |
| methylene fluoroide | CHF2 | 52.0200 | −51.6000 | | 0.9090 |
| 3,3,3-trifluoropropyne | F3CCCH | 94.0400 | −48.3000 | | |
| 1,1,1 trifluoroethane | CH3CF3 | 84.0400 | −47.3000 | −111.3000 | |
| nitroso-pentafluoro ethane | CF3CF2NO | 149.0200 | −42.0000 | | |
| chloroo difluoro methane or Freon 22 | ClCHF3 | 86.4700 | −40.8000 | −146.0000 | |
| chloro pentafluoro ethane | ClCF2CF3 | 154.4700 | −38.0000 | −106.0000 | |
| fluoroethane | CH3CH2F | 48.0600 | −37.7000 | −143.2000 | 0.7182 |
| perfluorodimethyl amine | (CH3) 2NF | 171.0200 | −37.0000 | | |
| perfluoropropane | C3F8 | 188.0200 | −36.0000 | −183.0000 | |
| perfluoro ethyl amine | CF3CF2NF2 | 171.102 | −35.0000 | | |
| trifluoro methyl peroxide | CF3OOCF3 | 170.0100 | −32.0000 | | |
| nitro trifluoro methane | F3CNO2 | 115.0100 | −31.1000 | | |
| dichloro difluoro methane or Freon 12 | Cl2CF2 | 120.9100 | −29.8000 | −158.0000 | 1.1834 |
| perfluoro propylene | CF3CFCF2 | 150.0200 | −29.4000 | −156.2000 | 1.5830 |
| 1,1,1,2 tetrafluoro ethane | CH3FCF3 | 102.0300 | −26.5000 | | |
| trifluoro methyl phosphine | F3COH2 | 102.0000 | −26.5000 | | |
| 1,1 difluoro ethane | CH3CHF2 | 66.0500 | −24.7000 | −117.0000 | 0.9500 |
| perfluoro 2-butyne | CF3CCCF3 | 162.0400 | −24.6000 | −117.4000 | |
| methyl chloride | CH3Cl | 50.4900 | −24.2000 | −97.1000 | 0.9159 |
| fluoro formaldehyde | FCHO | 48.0000 | −24.0000 | | |
| iodo trifluoro methane | CF3I | 195.9100 | −22.5000 | | 2.3608 |
| trifluoromethyl sulfide | (CF3)2S | 170.0800 | −22.2000 | | |
| trifluoro methane sulfonyl fluoride | F3CSO2F | 152.0700 | −21.7000 | | |
| pentafluoro thio trifluoro methane | F3C(SFS) | 196.0600 | −20.0000 | | |
| vinyl chloride or chloroethylene | CH2CHCl | 62.0500 | −13.4000 | −153.0000 | 0.9106 |
| bromo difluoro nitroso methane | BrF2CNO | 159.9200 | −12.0000 | | |
| 1-nitroso heptafluoro propane | CF3CF2CF2NO2 | 199.0300 | −12.0000 | −150.0000 | |
| trifluoro ethoxyl silane | C2H5OSiF3 | 130.1500 | −7.0000 | −122.0000 | |
| hexafluorodimethylamine | (CF3)2NH | 153.0300 | −6.7000 | −130.0000 | |
| ethyl trifluoro silane | C2H5SiF3 | 114.1400 | −4.4000 | −105.0000 | 1.2270 |
| perfluoro cyclobutane | C4F8 | 200.0300 | −4.0000 | −38.7000 | |

TABLE 2-continued

| Name | Formula | FW | BP (° C.) | MP (° C.) | Density (g/cc) |
|---|---|---|---|---|---|
| 3-fluoro propylene | FCH2CHCH2 | 60.0700 | −3.0000 | | |
| perfluoro methyl mercaptan | F3C5Cl | 136.5200 | −0.7000 | | |
| 2,2 difluoro propane | (CH3)2CF2 | 80.0800 | −0.4000 | −104.8000 | 0.9205 |
| nitro pentafluoro ethane | CF3CF3NO2 | 165.0200 | 0.0000 | | |
| perfluoro 2-butane | CF3CFCFCF3 | 200.0300 | 0.0000 | −129.0000 | 1.5297 |
| trans 2-butane | CH3CHCHCH3 | 56.1200 | 0.9000 | −105.5000 | 0.6042 |
| 1,1,1,2,2,3 hexafluoro propane | CH2FCF2CF3 | 152.0400 | 1.2000 | | |
| perfluoro cyclobutene | C4F6 | 162.0400 | 3.0000 | −60.0000 | 1.6020 |
| methyl bromide | CH3Br | 94.9400 | 3.6000 | −93.6000 | 1.6755 |
| bromo acetylene | BrCCH | 104.9400 | 4.7000 | | |
| pentachloro benzyl chloride | C6Cl5COCl | 312.8000 | 5.0000 | 87.0000 | |
| hexafluoro 1,3 butadiene | CF2CFCFCF2 | 162.0400 | 6.0000 | −132.0000 | 1.5530 |
| 2-chloro 1,1,1 trifluoroethane | ClCH2CF3 | 118.4900 | 6.9300 | −105.5000 | 1.3890 |
| dichloro fluoro methane or Freon 21 | Cl2CHF | 102.9200 | 9.0000 | −135.0000 | 1.4050 |
| 2-fluoro 1,3 butadiene | CH2CFCFCF2 | 72.0800 | 12.0000 | | 0.8430 |
| acetyl fluoride | CH3COF | 62.0400 | 20.8000 | | 1.0020 |
| 1,2 diclhloro 1,2 difluoro ethylene | CFClCFCl | 132.9200 | 21.1000 | −130.5000 | 1.4950 |
| 1-nitro heptafluoro propane | CF3CF2CF2NO2 | 215.0300 | 25.0000 | | |
| neopentyl chloride | (CH3)3CCH2Cl | 106.6 | 84.3000 | −20.0000 | 0.8660 |

Figure 4:
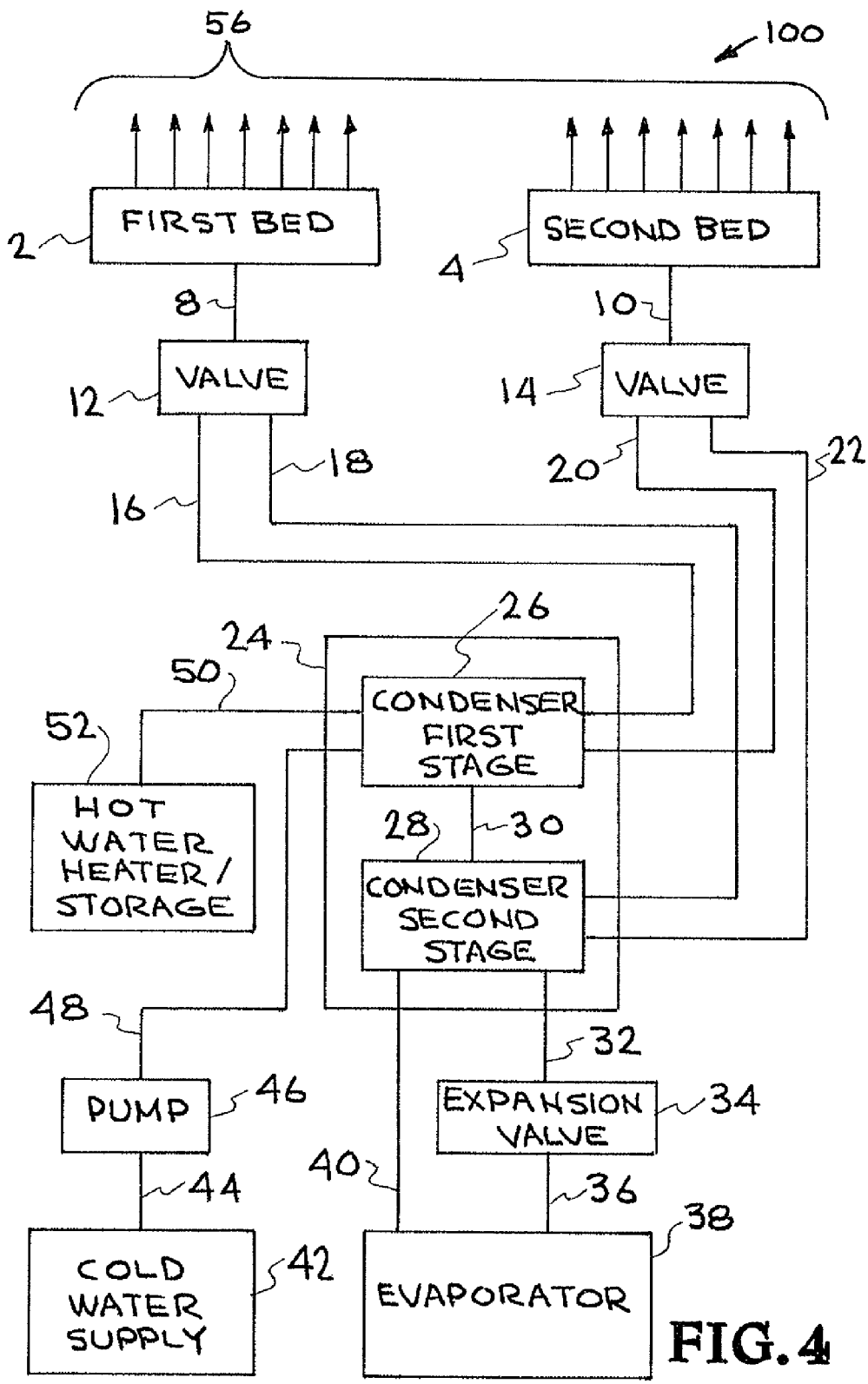
FIG. 4 illustrates the ADRS during the night time.

Referring now to FIG. 4, the ADRS is illustrated during the night time. The retractable sun shade 6 is positioned to uncover both beds 2 and 4 and both beds can radiate heat to the night sky 56. Most of the refrigerant will be adsorbed in bed 4.

Figure 5:
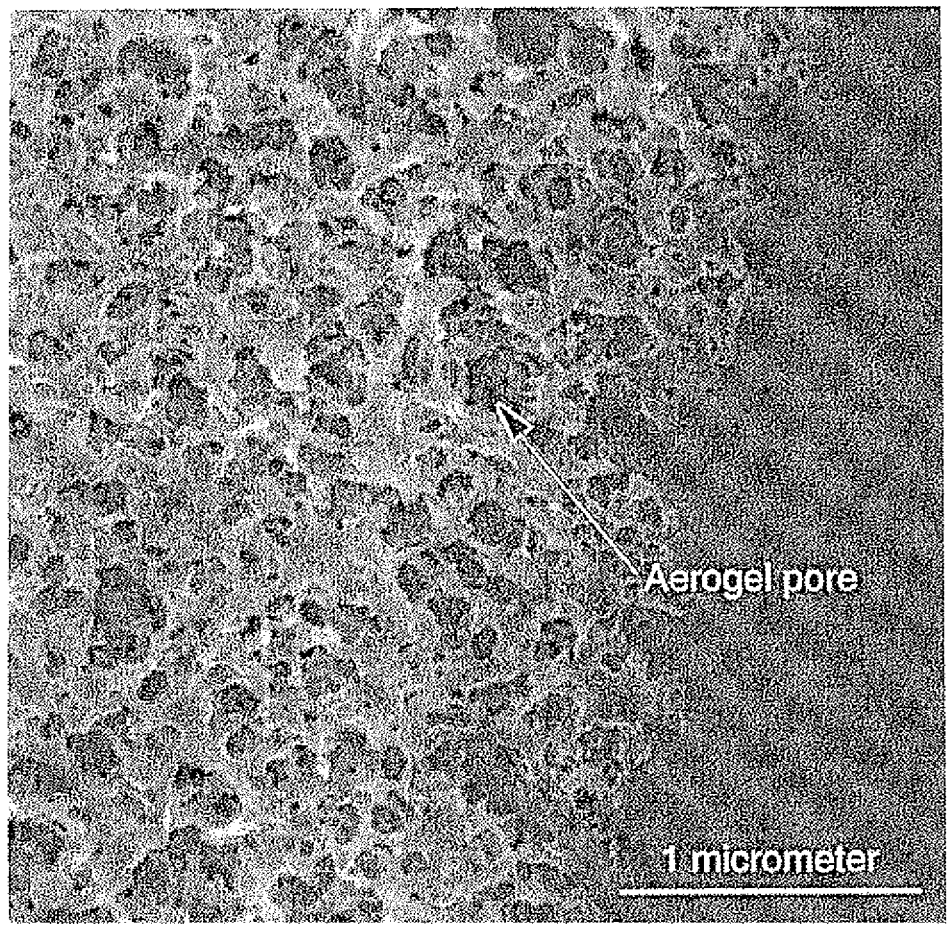
FIG. 5 is a scanning electron microscope view of a section of aerogel showing pores in the aerogel.

Referring now to, FIG. 5, a scanning electron microscope view of a section of aerogel showing pores in the aerogel. The present invention utilizes aerogel nanotechnology for dramatic enhancements in the active surface area of the adsorptive media. Aerogel nanotechnology, such as the advanced aerogel technology developed by the Lawrence Livermore National Laboratory (LLNL), can be used in one or more embodiments of this invention. For example, carbon based aerogels can be made with surface areas ranging from 600 to 3125 square meters per gram. In contrast, the best activated carbons, made from coconut hulls and similar materials, have specific surface areas of 100 to 1500 square meters per gram. Since sorption capacity is proportional to specific surface area, with the adsorption of approximately 1014 molecules per square meter in some cases, the higher surface area attainable with carbon aerogels can reduce the required mass of the adsorption bed, thereby leading to a refrigeration or air conditioning system of lower weight and smaller size. In addition to the use of carbon aerogels, other types of aerogels can also be used, including a wide variety of aerogels made of silica and metal oxides.

Figure 6A:
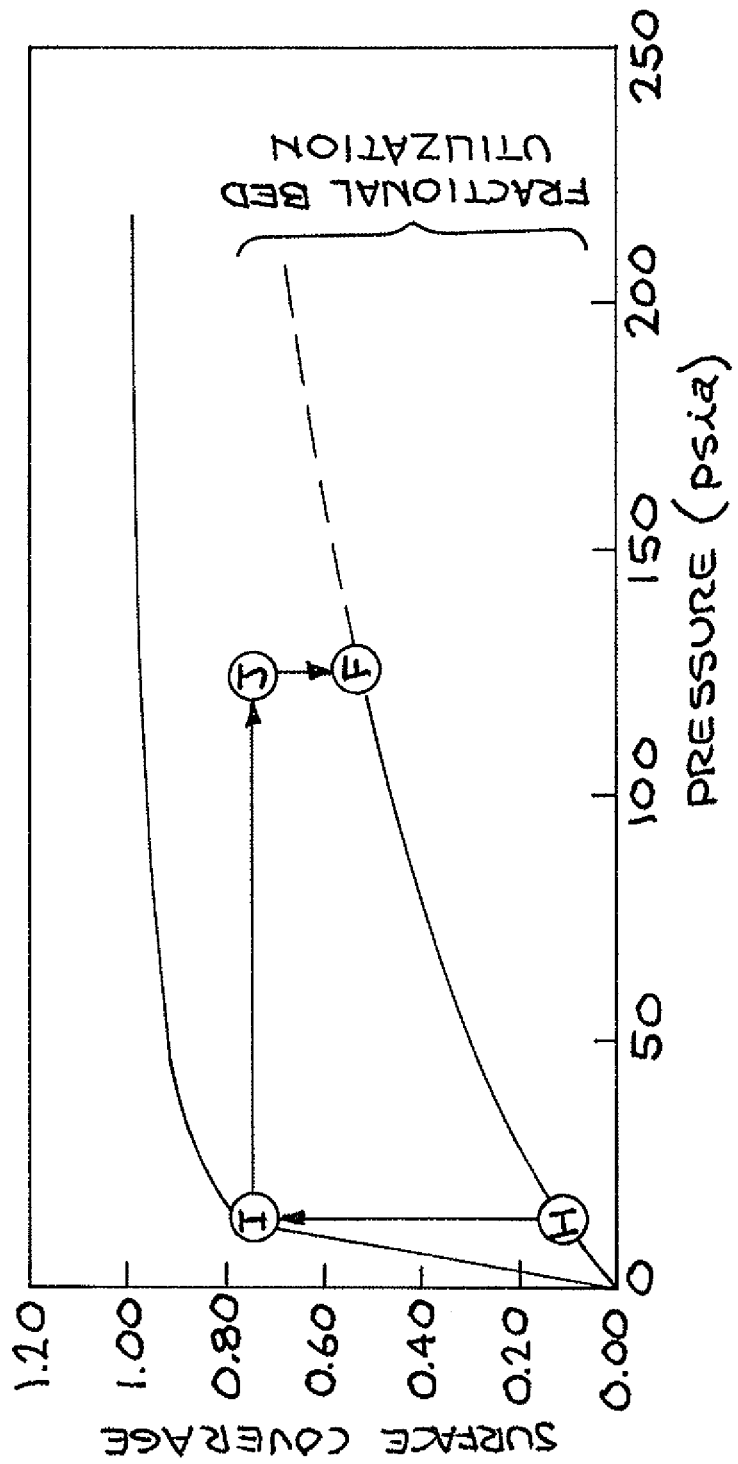
FIG. 6A illustrates the predicted Langmuir adsorption isotherm for a better refrigerant and adsorption-medium combination at various temperature levels.

Referring now to FIG. 6A, the predicted Langmuir adsorption isotherm for a better refrigerant and adsorption-medium combination at various temperature levels are shown in FIG. 6A. These predictions were based upon, with the free energy of adsorption and pre-exponential for calculation of the Langmuir parameter summarized below. One possible refrigeration cycle is shown as an overlay on the isotherm. The legend gives predictions for various temperature levels (° F.). In this more optimal case, temperature changes induced by solar heating do appear to be sufficient to cause enough change in surface coverage and gas-phase pressure to drive a practical refrigeration cycle. For a carbon aerogel with a demonstrated active surface area of 3,125 square meters per gram, and assuming a monolayer coverage of iso-butane, a mass loading of approximately 0.6 grams of isobutene per gram of aerogel is estimated. By using materials with even higher surface areas, loadings of 1 gram per gram or better may be possible.

The fractional coverage of active sites on the surface of the aerogel by adsorbed refrigerant can then be calculated from the Langmuir parameter and the gas-phase chemical activity of the species being adsorbed. The chemical activity is proportional to gas-phase above the surface where adsorption is occurring. Langmuir adsorption isotherms have been predicted for various compounds, including iso-butane on zeolites, as a function of pressure and temperature. In the case of iso-butane adsorbed on zeolite, predictions were based upon Langmuir parameters determined from the regression analysis of published data. In this specific case (isobutene on zeolite), temperature changes induced by solar heating appear to be insufficient to cause enough change in surface coverage and gas-phase pressure to drive a practical refrigeration cycle. Similar predictions have been made with optimized combinations of refrigerant and adsorption media (optimum specified in terms of predicted Langmuir parameter). In this optimized case, temperature changes induced by solar heating do appear to be sufficient to cause enough change in surface coverage and gas-phase pressure to drive a practical refrigeration cycle.

Adsorption of refrigerant on the surface of the aerogel (or other adsorption media) may obey the Langmuir adsorption isotherm. The Langmuir parameter for the it species ($K_i$) is defined by the Gibbs free energy of adsorption, the universal gas constant, and the absolute temperature:

$$K_i = \exp\left(\frac{-\Delta G_i^0}{RT}\right) \quad \text{[Equation 1]}$$

The fractional coverage of active sites on the surface of the aerogel by adsorbed refrigerant can then be calculated from the Langmuir parameter and the gas-phase chemical activity of the species being adsorbed (a). The chemical activity (a) is proportional to gas-phase above the surface where adsorption is occurring.

$$\frac{\theta}{1-\theta} = a\exp\left(\frac{-\Delta G_{ADS}}{RT}\right) \quad \text{[Equation 2]}$$

$$\theta = \frac{a\exp\left(\frac{-\Delta G_{ADS}}{RT}\right)}{a\exp\left(\frac{-\Delta G_{ADS}}{RT}\right) + 1}$$

In cases involving multi-component refrigerants, refrigerants compete for available active sites, in accordance with the following modified adsorption isotherm.

$$\theta_i = \frac{K_i a_i}{1 + K_i a_i + K_l a_l} \qquad \text{[Equation 3]}$$

Figure 6B:
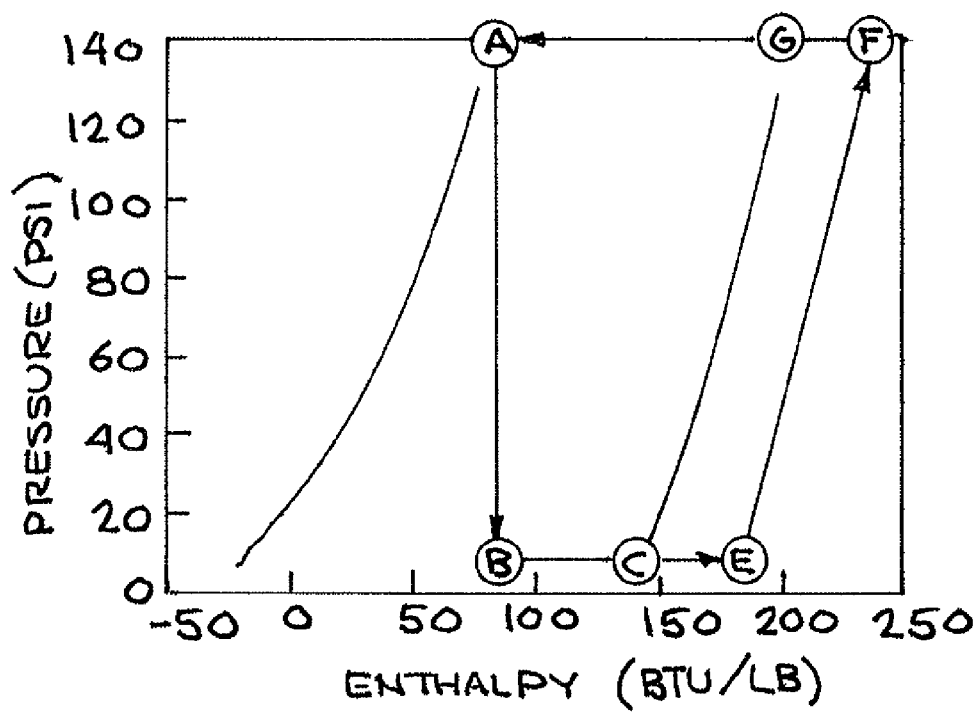
FIG. 6B illustrates a refrigeration cycle.

Referring now to FIG. 6B, one possible refrigeration cycle, and probably not the most optimal, is shown in FIG. 6B. The path from F to A represents condenser operation between 175° F. and 140° F., removing superheat and the latent heat of vaporization from the refrigerant. Then, the path from A to B represents the expansion of refrigerant, with partial condensation in the evaporator, which is assumed in this example to be operating at 10° F. The adsorption bed operates along the path, between points E and F. Clearly, these are calculations that do not account for the transient nature of the system.

Figure 7:
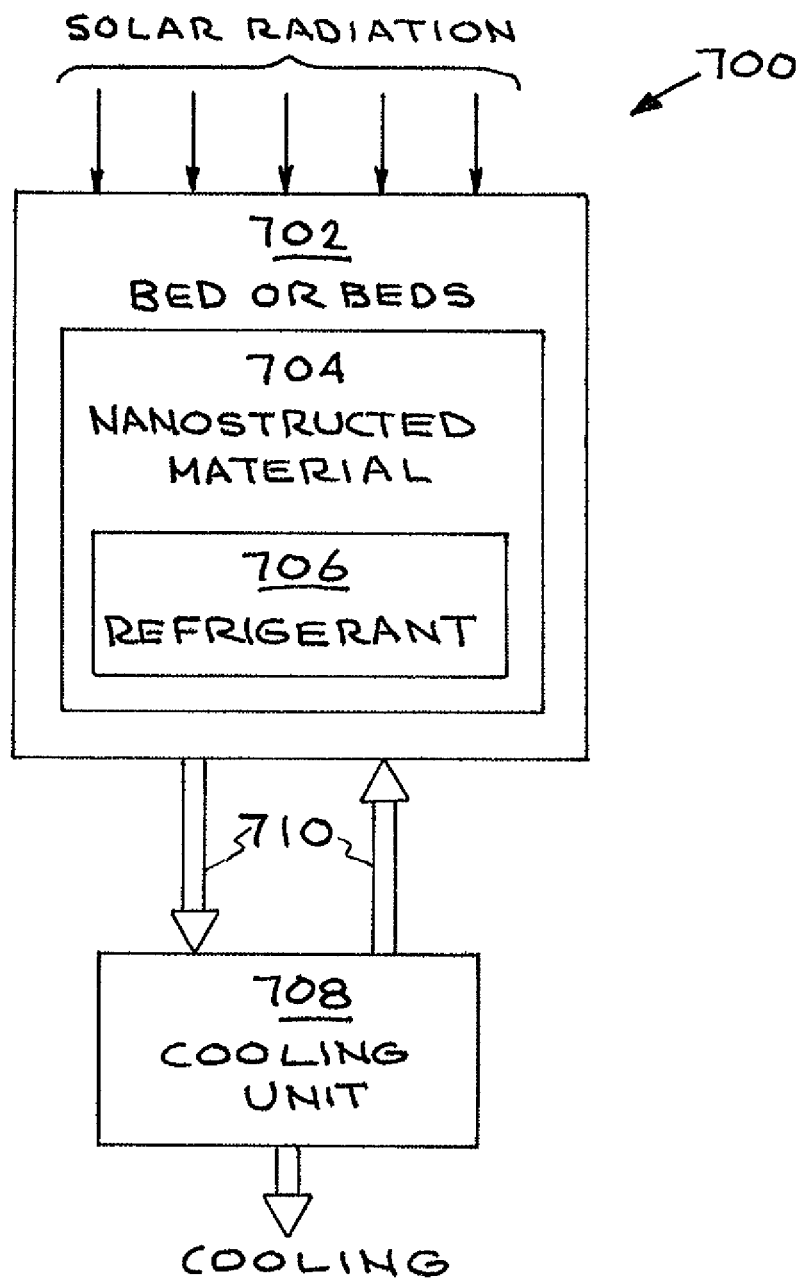
FIG. 7 illustrates another embodiment of a solar powered adsorption-desorption refrigeration system (ADRS) constructed in accordance with the present invention.

Referring now to FIG. 7, another embodiment of a solar powered adsorption-desorption refrigeration system (ADRS) constructed in accordance with the present invention is illustrated. The solar powered adsorption-desorption refrigeration system illustrated in FIG. 7 is designated generally by the reference numeral 700. Reference numerals are used to designate various components, systems, units, and devices which are generally identified as item(s).

Item 702 is a bed(s) of high specific surface area adsorption media, one example for this media is a nanostructural foam and/or aerogel based media 704. The bed(s) 702 is of high specific surface area adsorption media 704. Item 704 can be any nanostructural material. For example, the bed(s) item 704 can be an aerogel, a sol gel, a zeolite, or any other nanostructural material. Item 706 is a refrigerant.

Item 708 is a cooling unit. Item 708 includes a two-stage condenser and an expansion valve. Item 710 is a circulation system for circulating the refrigerant from the bed or beds of adsorption media to the cooling unit to provide cooling from energy from the sun and to return the refrigerant from the cooling unit to the bed or beds of adsorption media. The structural details of the ADRS system 700 having been described, the operation of the system will now be considered.

The U.S. Department of Energy (DOE) estimates the total primary energy consumption for commercial buildings was 10.72 quadrillion BTU (quads) in 1983, compared with 14.74 quads for the residential sector. According to the DOE Building Technologies Program, 40-60% of the energy used in U.S. commercial (and residential) buildings is for HVAC, creating massive potential for energy savings with a system that could cut cooling energy use by at least 30-60%. Initial vertical segments in the commercial building market include government and commercial office buildings; government facilities such as prisons, military bases, and schools; hotels and resorts; farming, wineries and other rural facilities; and general light industrial offices (e.g., printers and clothing makers).

The Applicant has developed a solar-powered aerogel-based adsorption cooling system. In the cooling system, solar radiation is focused by solar collectors onto on bed, which contains ultra high surface area aerogel. Heating causes thermal desorption of a refrigerant previously adsorbed into the aerogel's pores. Refrigerant desorption increases the gas-phase pressure in the pores, thereby forcing the gaseous refrigerant to flow out of the irradiated bed and through a two-stage condenser. In the condenser, heat is first removed from the hot gaseous refrigerant by a stream of water that eventually flows into a hot water heater and storage system. The refrigerant is then further cooled by chilled refrigerant leaving the evaporator after vaporization.

After passing through the two-stage condenser, the gaseous refrigerant undergoes expansion through an expansion valve. A portion of the refrigerant condenses in the evaporator, while some of the refrigerant is flashed and exits the evaporator. The evaporator absorbs heat from the area being cooled, which results in further vaporization of the refrigerant. The cool, vaporized refrigerant leaves the evaporator, passing through tubes in the shell-and-tube heat exchanger comprising the second stage of the two-stage condenser. After leaving the tube side of this heat exchanger, it flows back to the bed of aerogel.

During the first cycle, most of the refrigerant adsorbs on the bed. When the refrigeration cycle is reversed, the refrigerant is thermally desorbed from the bed. As the cycling rate increases, the quantity of adsorption media, the system size, and the associated cost becomes smaller.

The underlying features and advantages of the present invention are summarized: (1) solar-driven thermal desorption of a refrigerant from a suitable high-surface area media can be used instead of mechanical compressors as the basis of an efficient refrigeration cycle, thereby reducing the need for electrical power from grids for cooling homes and offices; (2) sorption capacity is proportional to specific surface area, with the adsorption of approximately $10^{14}$ molecules per square meter in some cases; (2) the higher surface area attainable with carbon aerogels can reduce the required mass of the adsorption bed, thereby enabling the construction of an adsorption-type air conditioning system of lower weight and smaller size relative to those relying on commercially available sorbent materials; (3) carbon aerogel can be fabricated as monolithic flat sheets for optimal heat and mass transfer in the adsorption bed; (4) carbon aerogels can be readily modified to tune the thermodynamics of adsorption, providing flexibility in the selection of refrigerants—including non-CFCs—and in operating temperatures; (5) injection-molded silica aerogel has the highest heat transfer resistance of any known engineered material and can be used to control heat leakage in the system, thereby increasing overall efficiency; (6) by eliminating moving parts, longer service life, lower maintenance costs and lower levels of noise can be achieved.

Aerogels are among the most versatile materials available owing to their wide variety of exceptional properties. For example, aerogels are known to exhibit the lowest thermal conductivities (0.017-0.021 W/m·K), sound velocities (<500 m/s), and refractive indexes (1.001-1.15) of any bulk solid material. Most of the properties of bulk aerogels are also exhibited in other forms of the material, such as thin sheets or films, which is important for integration of these materials into devices. As a result, aerogels have been developed for a variety of applications, including catalysis, sensing, thermal insulation, waste management, molds for molten metals, optics, capacitors, energetic composites, imaging devices, cosmic dust collection, and high-energy-density physics applications. LLNL is recognized as a world leader in aerogel research, holding several patents in the technology dating back to the mid-1990s. Organic and carbon aerogels were both invented at LLNL, and much of the technology resulting from that research has been licensed for various technologies, including capacitors and desalination. The process used to synthesize high-surface-area carbon aerogel adsorbents was also developed at the Laboratory, where the materials are currently used as adsorbents for hydrogen in low-pressure storage tanks. Applicant has the requisite facilities to scale up production of these materials to meet the needs of this effort.

In addition, the rapid supercritical extraction (RSCE) process that will be used to fabricate the insulating aerogel parts was developed and patented by LLNL. The RSCE process—very similar to injection molding, a common process used to manufacture some plastics—offers a number of advantages over conventional supercritical drying, including simpler and less costly hardware, monolithic gels that do not have to be pre-formed, and an overall much faster process—the entire process for making monolithic parts can be accomplished in just a few hours instead of the several days required by conventional supercritical drying. The RSCE process will extremely valuable in the fabrication of conformable monolithic for the proposed cooling system's insulation.

Many conventional solar concentrators rely on parabolic mirrors to heat pipes located at the focal points of the mirrors. In the case of adsorptive refrigeration and cooling systems, this dictates that the adsorption media be placed in a cylindrical envelope for the most efficient heating. Alternatively, large inexpensive Fresnel optics, now available can be used for solar collection from the solar-side of planar panels, providing designers with some engineering advantage. For the solar collectors, this project will bring to bear LLNL's extensive experience in designing optics. Applicant expects to use commercially available molded acrylic lenses or reflective concentrators. Applicant will also leverage Livermore's extensive optics design experience to focus on cost reduction and including space heating options with cooling to promote market penetration.

Carbon aerogel (CA) is a unique porous solid with network structures consisting of interconnected carbon particles and, as a result, these materials exhibit many interesting properties, such as high surface-to-volume ratios, continuous porosities and high electrical conductivity. Lawrence Livermore National Laboratory has developed a synthetic approach to fabricate CAs with BET surface areas of over 3,000 m$^2$/g. These surface area values are the highest that Applicant is aware of for CAs and are comparable to those of the highest surface area activated carbons. Our synthetic strategy involves the thermal activation of a CA material with structural features (particles and pores) on the micrometer scale. This approach not only provides access to high surface areas in CA materials but also affords monolithic materials with bimodal porosity (macro- and micropores).

An important criterion for effective physisorption is a high surface area that exposes a large number of sorption sites to ad-atom or ad-molecule interaction. Moreover, these sites need to have potential wells that are sufficiently deeper than kT if physisorbents are to operate at reasonable engineering temperatures. Porous carbon materials are promising candidates for the physisorption of refrigerant gases due their lightweight frameworks and high accessible surface areas. High surface area carbons have been studied extensively for low pressure storage of transportation fuels, such as hydrogen and methane. For example, appreciable amounts of methane can be adsorbed on conventional high surface area activated carbons at 298 K and 3.5 MPa. More specifically, the loading of $CH_4$ on such activated carbons is approximately 17 weight percent or 0.17 grams of methane per gram of solid carbon. Carbon aerogels (CAs) are a unique class of porous carbons that possess ultrafine cell sizes, continuous porosities and low mass densities. These properties arise from the aerogel microstructure, a three-dimensional network of interconnected primary carbon particles with diameters that can range from a few nanometers to several microns. Applicant recently developed a synthetic approach at LLNL to fabricate mechanically robust CA monoliths with BET surface areas in excess of 3,000 m$^2$/g of carbon aerogel, substantially greater than that achievable with the best activated carbons. These surface area values are the highest reported for CAs and exceed the accessible surface area in most commercially available activated carbons. In addition to extremely large specific surface areas, these materials exhibit a number of other desirable qualities for the adsorption of refrigerant gases. First, the porosity in these CAs is bimodal, consisting of a large population of micropores (0.7 to 1.2 nanometers in diameter) connected by a continuous macroporous network. Hierarchically porous carbons of this type are superior to carbons with unimodal porosity (i.e. activated carbons) in terms of diffusion efficiency and surface area. The surface chemistry of the CA can be readily modified to tune the interaction (binding energy) between the refrigerant gas and the adsorbent. This aspect will be particularly important for controlling desorption of refrigerant from the CA during solar heating. These materials do not require the specialized drying processes (i.e. supercritical extraction) that are typically employed in the synthesis of other aerogel materials, minimizing both the fabrication time and cost associated with these materials. Finally, unlike many other porous carbons, the CAs can be fabricated in a variety of forms, including conformable monoliths, a feature that can be advantageous for this application. The flexibility associated with the design of these materials should allow us to optimize not only adsorbate-adsorbent interactions, but also maximize the gravimetric and volumetric capacities of these CA materials. Therefore, Applicant believes that these high surface area CAs offers viability to engineer an efficient adsorbent bed for refrigerant gases.

The system may use a two-stage condenser to cool and condense the desorbed refrigerant. The first stage will use an external water stream, resulting in a hot water stream for other uses. The second stage will be chilled by the return line of evaporated and expanded refrigerant.

The evaporator is a two-phase boiler with both liquid and gaseous refrigerant. Liquid is continuously evaporated as heat is absorbed from the building primary heat exchanger. The primary heat exchanger can be of any conventional design, which will allow easy retrofit of the proposed system into new or existing construction.

Silica aerogels are a special class of open-cell foams derived from highly cross-linked gels that are dried using special techniques (supercritical extraction) to preserve the tenuous solid network. These materials have ultrafine cell and pore sizes (<1,000 Å), continuous porosity, high surface area density, and a microstructure composed of interconnected colloidal-like particles or polymeric chains with characteristic diameters of 100 Å. This microstructure is responsible for the unusual optical, acoustical, thermal, and mechanical properties of silica aerogels. In fact, silica aerogels have the lowest thermal conductivity (0.017-0.021 W/m·K) of any solid material and, as a result, have been commercially developed for thermal insulation applications. These materials are ideal insulators for the proposed AC system. The rapid supercritical extraction process used to fabricate these materials is scalable and can be used for high-throughput production of insulating parts.

These components will be designed to be compatible with existing building ventilation systems.

Figure 8:
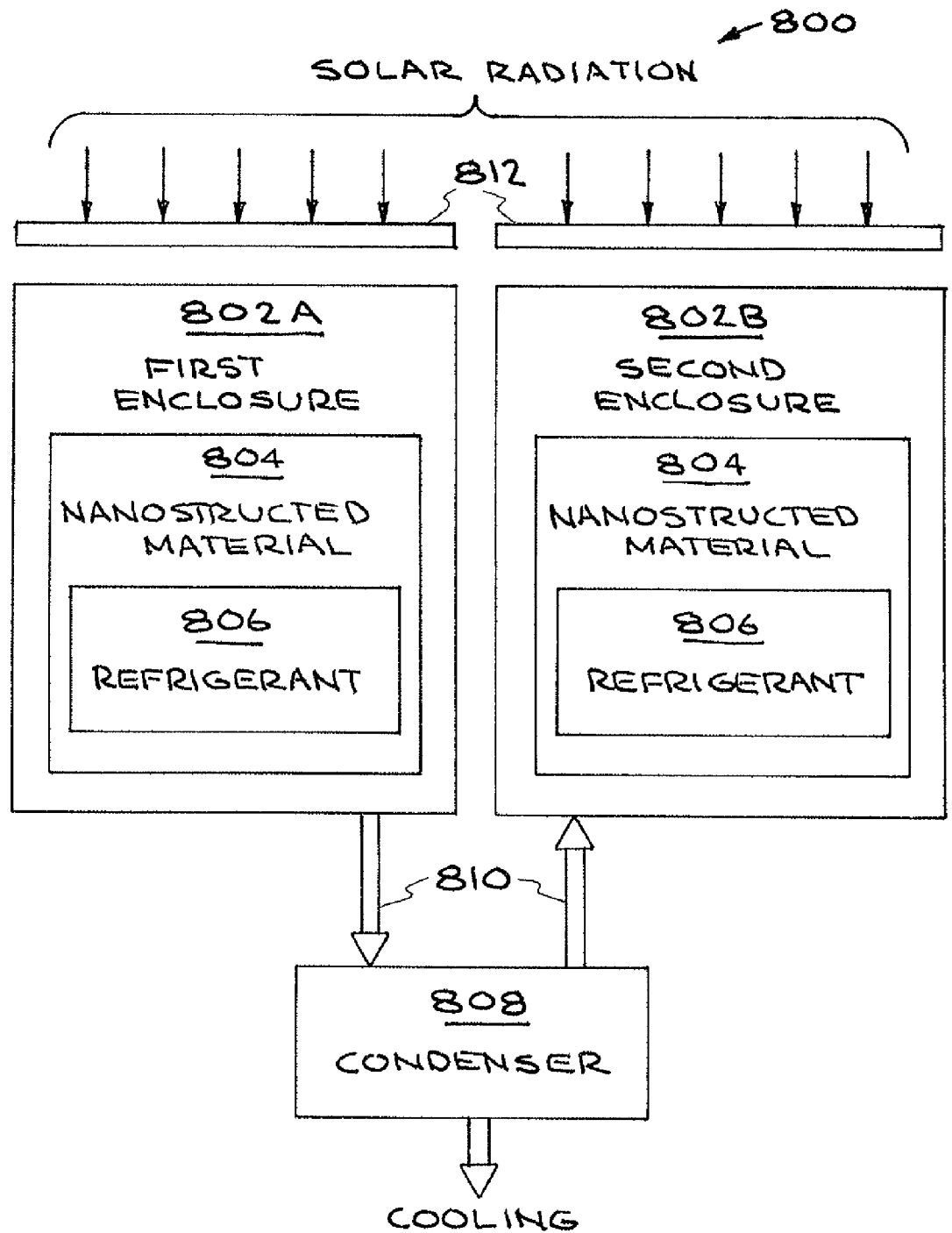
FIG. 8 illustrates yet another embodiment of a solar powered adsorption-desorption refrigeration system (ADRS) constructed in accordance with the present invention.

Referring now to FIG. 8, another embodiment of a solar powered adsorption-desorption refrigeration system (ADRS) constructed in accordance with the present invention is illustrated. The solar powered adsorption-desorption refrigeration system illustrated in FIG. 8 is designated generally by the reference numeral 800. Reference numerals are used to designate various components, systems, units, and devices which are generally identified as item(s).

Item 802A is a first bed of high specific surface area adsorption media, one example for this media is a nanostructural foam and/or aerogel based media. Item 4 is a second bed with the same properties of the first bed item 802A. Item 802B is a retractable sun shade that can be moved to cover or uncover either beds 802A or 4 or can be positioned to uncover both beds 802A and 4 at the same time. The beds of high specific surface area adsorption media, item 802A and item 802B, can be any nanostructural material. For example, the beds item 802A and item 802B can be an aerogel, a sol gel, a zeolite, or any other nanostructural material.

Item 812 can be any light blocking system adapted to selectively block energy from the sun. Item 812 can alternatively be a louvered shade, a shutter shade, an electronic light blocking system for blocking energy from the sun, or any other system for blocking energy from the sun.

Refrigerant desorption increases the gas phase pressure in the pores of the adsorption media, thereby forcing the gaseous refrigerant (CR) to flow-out of the first bed 802A. The GS flows to the condenser 808. After passing through the two-stage condenser the GS undergoes isenthalpic expansion in the expansion valve. A portion of the GS condenses in the evaporator while some of the GS is flashed (chilled refrigerant) and exits the evaporator. The evaporator absorbs heat from the room or area being cooled, which results in further vaporization of the GS. The chilled vaporized GS exits the evaporator and through a line enters the condenser second stage and proceeds through the tubes of a shell-and-tube heat exchanger which comprises the condenser second stage of the two-stage condenser. The GS leaves the condenser by way of a line and passes through a valve and deposited in the adsorption media of bed 802B which is at a lower temperature than the first bed 802A.

Different embodiments of Applicant's invention include or incorporate one or more of the following features:

Solar driven adsorption-based refrigeration cycle—This invention directly converts solar heat to the work of compression necessary to drive the adsorption-based refrigeration system. The outer surface of the pressure envelope surrounding the adsorption bed would be coated to maximize the absorption of solar radiation. Solar concentration may also be used, exploiting concave mirrors and large-format Fresnel lenses.

High surface area aerogel adsorption beds—This invention exploit's LLNL's aerogel nanotechnology for dramatic enhancements in the active surface area of the adsorptive media. LLNL's advanced aerogel technology will be used in one embodiment of this invention. For example, carbon based aerogels can be made with surface areas ranging from 600 to 3125 square meters per gram. In contrast, the best activated carbons, made from coconut hulls and similar materials, have specific surface areas of 100 to 1500 square meters per gram. Since sorption capacity is proportional to specific surface area, with the adsorption of approximately 1014 molecules per square meter in some cases, the higher surface area attainable with carbon aerogels can reduce the required mass of the adsorption bed, thereby leading to a refrigeration or air conditioning system of lower weight and smaller size. In addition to the use of carbon aerogels, other types of aerogels can also be used, including a wide variety of aerogels made of silica and metal oxides.

Adsorption bed in form of monolithic sheets—Sheets of monolithic carbon aerogels provide not only ultra high surface area, but also the ability to construct flat sheets with optimal heat and mass transfer characteristics. These monolithic sheets of aerogel can be bonded to the inner surfaces of the pressure envelope surrounding the adsorption bed.

Ability to use non-CFC refrigerants—It is now widely accepted that CFC, HFC, and HCFC refrigerants, as well as other halogenated molecules, pose a serious threat to the Earth's ozone layer. The use of non-halogenated refrigerants is therefore desirable from an environmental perspective. This invention is capable of using a wide variety of both halogenated, as well as more environmentally benign non-halogenated refrigerants.

Exceptional thermal insulation—In one embodiment, the invention uses injection-molded silica aerogel for thermal insulation. This insulation has the highest heat transfer resistance of any known engineering material, and will therefore help control heat leakage in the refrigeration and air conditioning system, therefore increasing the overall efficiency of the system.

No moving parts—The invention relies on the solid adsorption bed for compression, and has no moving parts. Therefore; the service life of refrigeration and air conditioning cycles based upon this technology are expected to have unlimited service life, and virtually eliminate wear out associated with moving parts. No lubricants are required. The elimination of moving parts will dramatically reduce the noise from the cooling system, which will be especially desirable in urban settings.

Hermetically sealed system—By eliminating the need for moving parts and electrical feed-through, a hermetically sealed pressure envelope that contains the refrigerant can be used. This will minimize the probability of refrigerant leakage from the system, and will therefore eliminate the need for periodic charging of the system with makeup refrigerant.

Enhanced solar collection—The world's largest Fresnel optics, originally developed for the National Ignition Facility, can be used to enhance solar concentration and increase the upper operating temperature of the adsorption bed during thermal desorption, thereby achieving higher compression and greater efficiency. Depending upon the convention used, this feature will increase the COP (coefficient of performance), the SEER (seasonal energy efficiency rating), or the EER (energy efficiency rating) of the system.

Flexible heating options—Sufficient flexibility to use fossil fuel or electricity for auxiliary heating. This system can also be operated from other heat sources, including waste heat from automotive engines, industrial plants, and nuclear power plants. This novel refrigeration system is therefore suitable for high latitude, cold climates and cloudy days.

Integration with hot water heater—The system will have an integrated hot water heater.

Benefits

Applicant's invention benefits including the following:

1. Solar powered with flexibility for alternative heating options

2. Ultra-high surface area adsorption media, with substantially higher refrigerant adsorption capacity per mass of adsorption bed, reducing size and making installation easier 3. No moving parts, extreme reliability, and silent operation 4. Hermetically sealed refrigeration loops, preventing leakage, eliminating need for lubricants and recharging, and enabling recycling of refrigerant 5. Monolithic sheets of adsorption media for superior heat and mass transfer 6. World's best-known insulation better control of heat flow and improved system efficiency 7. Higher thermal desorption temperature and compression for better efficiency 8. Integration of other household appliances, such as hot water heater.

Additional details of Applicant's invention are described and illustrated in U.S. Provisional Patent Application No. 61/256,243 entitled "Solar-Powered Adsorptive Refrigeration Cycle with Nanostructural Foam & Aerogel Based Media" filed Oct. 29, 2009 by Applicant. U.S. Provisional Patent Application No. 61/256,243 entitled "Solar-Powered Adsorptive Refrigeration Cycle with Nanostructural Foam & Aerogel Based Media" filed Oct. 29, 2009 by Applicant is hereby incorporated in its entirety by reference for all purposes.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A solar-powered adsorption-desorption refrigeration apparatus that provides cooling from energy from the sun, comprising:
   a first bed of adsorption media positioned to receive energy from the sun;
   said first bed of adsorption media comprising a first nanostructural material made of a first aerogel;
   a refrigerant in said first bed of adsorption media;
   a second bed of adsorption media positioned to receive energy from the sun;
   said second bed of adsorption media comprising a second nanostructural material made of a second aerogel;
   said refrigerant in said second bed of adsorption media;
   a cooling unit;
   a circulation system for circulating said refrigerant from said first bed of adsorption media to said cooling unit to provide cooling from energy from the sun and from said cooling unit to said second bed of adsorption media, and
   a retractable shade positioned between said second bed of adsorption media and the sun.

2. The solar-powered adsorption-desorption refrigeration apparatus that provides cooling from energy from the sun of claim 1 wherein second aerogel of said second bed of adsorption media has pores and wherein said refrigerant is absorbed in said pores.

3. The solar-powered adsorption-desorption refrigeration apparatus that provides cooling from energy from the sun of claim 1 wherein first aerogel of said first bed of adsorption media has pores and wherein said refrigerant is absorbed in said pores.

* * * * *